United States Patent [19]

Wessinger

[11] 4,139,287
[45] Feb. 13, 1979

[54] PROJECTOR LEVELING AND FOCUSING AID AND METHOD OF USING SAME

[76] Inventor: Bruno E. Wessinger, 165 Harbor South, Amityville, N.Y. 11701

[21] Appl. No.: 783,273

[22] Filed: Mar. 31, 1977

[51] Int. Cl.² .................. G01C 9/24; G03B 21/54
[52] U.S. Cl. ........................... 353/120; 33/389;
353/40; 353/121; 353/122
[58] Field of Search .............. 33/365, 379, 384, 388, 33/389; 353/120, 122, 121, 94, 1, 2, 40, 41

[56] References Cited

U.S. PATENT DOCUMENTS

| 3,843,244 | 10/1974 | Facchini | 353/2 |
| 3,894,342 | 7/1975 | Goode | 33/388 |

*Primary Examiner*—Steven L. Stephan
*Attorney, Agent, or Firm*—Kirschstein, Kirschstein, Ottinger & Cobrin

[57] ABSTRACT

A slide body of a rigid transparent material is sized to be received within a slide transparency projector. The slide body includes a bubble level indicator having a narrow arcuate chamber which is filled with a liquid to create a bubble of air trapped within a band of fluid. The bubble is displaceable within the arcuate chamber and remains at the highest point therein. When the slide is level, the bubble rests at the mid-point of the band. The slide body is also provided with a pattern of concentric rectangles and a pattern of markings to indicate the extent of deviation of the bubble from its position at the mid-point of the band. The arcuate band, bubble and pattern of markings are projected onto the screen by a projector to permit a projectionist to readily ascertain whether or not the projector is in focus and is level. The projector can then be focused and leveled by adjusting the focusing and leveling system of the projector.

2 Claims, 7 Drawing Figures

PROJECTOR LEVELING AND FOCUSING AID AND METHOD OF USING SAME

BACKGROUND OF THE INVENTION

1. Field of the Invention

The invention relates to projection equipment and more particularly to a projector leveling and focusing aid for leveling and focusing a still image projector as well as a method for leveling and focusing more than one still image projector when images from several projectors are to be superimposed or aligned.

2. Prior Art

Most still image or slide transparency projectors are provided with leveling pads or feet on their chassis which permit a projectionist to level the projector with respect to the horizontal by manipulating the pads so that they compensate for any sloping of the surface supporting the projector.

Most of the still image projectors available to the general public for home or entertainment use require that one of the slides to be shown be first projected onto the screen. The projectionist then focuses the projector and attempts to level the projector and the image by eye i.e., the projector is manipulated until the projected image appears to him not to be sloping on the screen.

Since the leveling and focusing problems occur most frequently where the projector is repeatedly dismantled or stored and set up periodically for visual programs, there is an enormous waste of time in properly leveling and focusing these projectors.

Moreover, it is currently becoming more and more popular to present still image projections consisting of images from more than one projector wherein the images are superimposed in which case the leveling problem associated with one projector is compounded by the number of projectors being used and further, the problem of getting the various images in proper registry is created.

There are provided in the prior art structures for slides to test the performance of lenses, i.e., grid patterns which may be distorted if the lens is not properly ground, as disclosed in the British Pat. No. 742,235. The structure disclosed in this British patent, however, does not aid in the leveling of one or a series of projectors nor can it be used to ensure the proper registry of images projected from two or more projectors.

It is toward the elimination of these and other problems that the present invention is directed.

SUMMARY OF THE INVENTION

1. Purposes of the Invention

It is an object of the present invention to provide a projector leveling and focusing device which aids a projectionist in the leveling and focusing of a still image projector.

Another object of the present invention is to provide a projection leveling and focusing device which accurately indicates to the projectionist the surface area of the screen which will carry the projected image.

A further object of the present invention is to provide a projection leveling and focusing device which will permit a projectionist to properly level, focus and align more than one still image projector on the same screen.

A yet further object of the present invention is to provide a projection leveling and focusing device which is inexpensive to manufacture, simple to use, and which can be employed in present still image projection systems.

A still further object of the present invention is to provide a method of leveling and focusing a still image projector using a projector leveling and focusing device.

A yet further object of the present invention is to provide a method of leveling, focusing and aligning more than one still image projector so that the images projected therefrom will be in registry.

Other objects of the present invention in part will be obvious and in part will become apparent as the description proceeds.

2. Brief Description of the Invention

Generally, the above and other objects of the present invention are accomplished by a rigid slide of a transparent material having a flat front face provided with a peripheral rim and a rear face. The sides and bottom of the slide are provided with pads or feet on the peripheral rim. The central area of the slide bears sets of distinct markings and patterns. In addition, a bubble level in the form of an arcuate chamber containing a colored fluid and a bubble of air, which bubble always rises to the highest part of the chamber, extends across the mid-section of the slide.

A pattern of concentric rectangles on the slide having the overall dimensions of various size transparencies may be projected through the projector to indicate the area of the screen which will be covered by a particular sized transparency. Other markings indicate the axial centerline of the slide and present means for projecting test lines on a screen to aid in focusing and aligning the projector.

When the slide is level, the bubble in the arcuate chamber is bisected by the vertical axial centerline. Secondary markings in the form of vertical lines equally spaced from the vertical centerline on each side thereof may be provided to aid in determining the relative position of the bubble in the arcuate chamber and the extent to which the slide is not level.

When the slide is inserted into the projector, the resulting image projected on the screen permits the projectionist to focus the image by adjusting the lens system of the projector until the various lines are sharp and clear and further aids in the leveling of the projector since the projectionist will see the position of the bubble in the arcuate chamber and can adjust the leveling mechanism of the projector so that the bubble is positioned so as to be bisected by the vertical centerline.

Moreover, by using seperate identical slides in more than one projector, the projectionist can not only focus each projector, but can readily adjust the projector so that each image will be level and will be in registry with every other image projected. This is accomplished by bringing each of the series of score lines projected by each projector into registry on the screen and also by bringing each bubble in each bubble indicator into registry on the screen.

The invention consists in the features of construction, arrangement of parts and sequences of operation which will be detailed in hereinafter and described in the appended claims.

BRIEF DESCRIPTION OF THE DRAWINGS

For a better understanding of the present invention, reference should be had to the accompanying drawings wherein like numerals of reference indicate similar parts throughout the several views and wherein.

DESCRIPTION OF THE PREFERRED EMBODIMENTS

Figure 1:
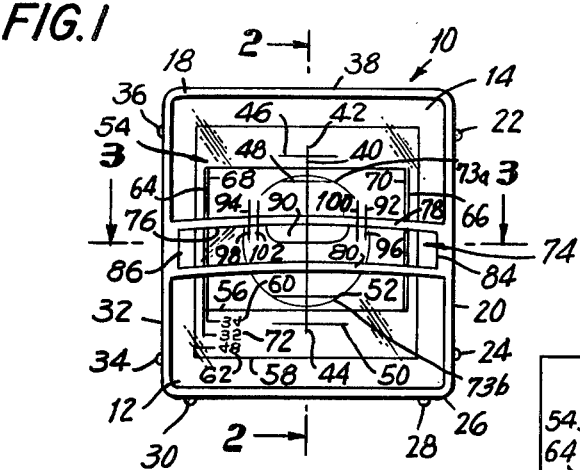
FIG. 1 is a front elevational view of the projector leveling and focusing device in accordance with the present invention.

The projector leveling and focusing aid in accordance with the present invention is identified in the drawings generally by the reference numeral 10. The purpose of the device is to aid in the proper leveling, focusing and aligning of a still image projector or projectors such as the commonly used transparency or slide projector. However, the principle employed can also be used with other still image projector systems such as an overhead projector.

As used in the specification and the claims, the term level is defined as that alignment of a projector in which the image projected therefrom onto a screen conforms to a horizontal plane so that, to a person viewing the image, it is not sloping.

Figure 2:
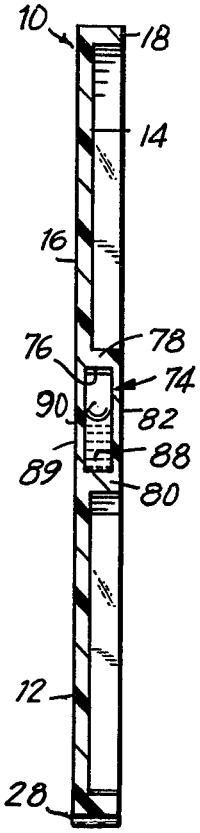
FIG. 2 is an enlarged sectional view taken substantially along the line 2—2 of FIG. 1.

The projector leveling and focusing aid 10 is formed from a rigid transparent material preferably plastic which is injection molded to the shape and characteristics described. As best seen in FIG. 2, the aid 10 has a slide portion 12 with a flat front face 14, and a flat rear face 16. The front face 14 is the side of the slide which faces a projection lamp (not shown) when the slide 12 is positioned in a projector. The front face 14 has a raised peripheral rim or border 18. The overall dimensions of the slide 12 i.e., its heighth and width, are substantially the same as the overall dimensions of a standard transparency or slide holder so that the projector leveling and focusing aid of the present invention can be placed as the first slide in a slide magazine and can be positioned within the projector and removed from the projector through the same mechanism used to position and eject a transparency holder in the projector nest.

It should be noted that the essence of the present invention resides in the particular construction of the projector leveling and focusing aid and the method of aligning multiple projector systems by using the aid and does not reside in a particular structure of a projector and/or projector leveling mechanism. As a result, for the sake of brevity, the details of these structures, which are well known in the art, are not illustrated or described herein.

With continued reference to FIG. 1, there is provided a series of pads or protuberances extending from the peripheral rim 18. Along the side 20 of rim 18 are pads 22 and 24. Similarly, along the bottom 26 of the rim 18 are pads 28 and 30. Likewise, along side 32 of the rim 18 are pads 34 and 36. The top edge 38 of the rim 18 does not have such pads. The purpose of the pads is to reduce the surface area over which the slide 12 is supported within the projector to minimize, through the minimum surface contact, any interference of foreign matter with the correct positioning of the slide against the principle support surface within the projector.

The principle support surface just mentioned is not shown in the drawings since the present invention does not concern itself with the specific structure of the projector. It will be apparent to those skilled in the art that the principal support surface is a surface within the projector nest area against which the slide which is being projected rests. This principal support surface may be either a vertical side surface or a horizontal bottom surface within the projector nest. In order to permit the leveling device of the present invention to have universal application, pads are provided along the sides as well as the bottom of the peripheral rim 18 so that there will be minimum contact between a vertical side or a horizontal bottom support surface.

The pads hereinabove mentioned also aid in the accurate manufacturing of the projector leveling and focusing aid. One or both of the pads on the same side of the peripheral rim 18 may be shaved, filed or otherwise reduced to permit a rapid adjustment to the aid when it is being standardized so that it will accurately measure the levelness of the surface against which it is rested.

With continued reference to FIG. 1, there are provided on the central area of the slide 12, sets of markings and patterns which serve different purposes as will hereinafter be described. The markings and patterns may appear as raised portions on the face 16 if the slide is injection molded, or alternatively may also be etched or scored into the face.

A first marking 40 lies along and corresponds to the vertical axial centerline of the slide 12. There are provided proximate either ends 42 and 44 of the marking 40, spaced horizontal marking lines 46, 48 and 50, 52 respectively for reasons which will become apparent as the description proceeds.

There is also provided a pattern of concentric rectangles identified generally by the reference numeral 54. Each of the rectangles in the pattern have the overall dimensions i.e., height and width, of the surface area covered when a particular standard sized transparency is projected onto the screen. Namely, the rectangle identified by reference numberal 56 is identical in size to a standard 34 millimeter transparency. The rectangle identified by reference numeral 58 is identical to the size of a standard 46 millimeter transparency. For ease in identification, these patterns may be identical by numerical legends as shown by numerals 60 and 62 respectively. The vertical markings 64 and 66 which lie immediately adjacent the vertical legs 68 and 70 of the rectangle 56 correspond to the side edges of a 35 millimeter slide and may also be identified as such by the legend 35 on the slide 12 as illustrated by reference numeral 72.

The slide 12 may also include arcuate markings 73a and 73b of a circle which has as its center, the center of the slide 12.

Figure 3:
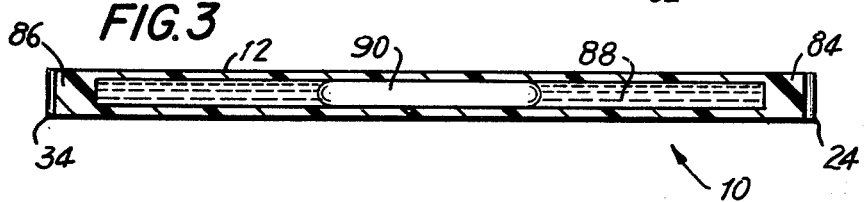
FIG. 3 is an enlarged sectional view taken substantially along the line 3—3 of FIG. 1.
Figure 4:
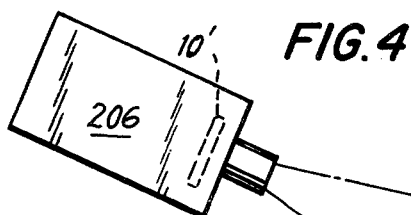
FIG. 4 is a schematic view showing use of the projector leveling and focusing device in accordance with the present invention in aligning a plurality of projectors.

In addition to the above markings and patterns, the slide 12 also includes a bubble level indicator identified generally by the reference numeral 74 which is in the form of an arcuate band of a constant width of colored fluid crossing the mid-section of the slide. As best seen in FIGS. 3 and 4, the bubble level indicator 74 includes a narrow chamber 76 formed by an arcuate top wall 78 and an arcuate bottom wall 80, which extend from the front face 14 a distance equal to that of the peripheral rim, and an back wall 82. The ends of the chamber 76 are sealed at 84 and 86 as shown. The chamber is filled, but not completely by the fluid 88 so that a bubble 90 of air is formed therein which will rise to the highest point in the chamber and assume the position shown in FIG. 1, i.e., at the midpoint of the arcuate band, when the slide is level. The portion of the slide 12 which forms the front wall of the chamber 76 is of a reduced thickness to equal the thickness of the rear wall 82. This permits the chamber 76 to have sufficient depth so that a sufficient quantity of fluid is contained therein to ensure proper functioning of the bubble level indicator.

The specific fluid 88 used in the bubble level indicator 74 and the particular radii of the arcuate top and bottom wall 78 and 80, respectively, are readily known to those skilled in the art.

The fluid used in the bubble level indicator may be a low viscosity oil such as that marketed by Exxon under the trademark ISOPAR-E. This fluid is preferably colored, as mentioned herein, so that the bubble within the chamber is readily discernible. In addition, because the width of the chamber is relatively narrow, the fluid is somewhat less viscous than the fluid most often used in standard bubble level indicators since it would take much longer for the bubble to rise to the highest point in the chamber.

The bubble level indicator 74 also includes a series of markings in the form of sets of spaced vertical lines 92 and 94 which lie on the rear face 14 of either side of the vertical centerline 40 and extend through the top arcuate wall 78, as shown. The marking 96 of the first set 92 of spaced vertical lines and the marking 98 of the second set of spaced vertical lines lie equidistant from the vertical centerline 40. Similarly, marking 100 of the first set of vertical lines 92 and marking 102 of the second set of vertical lines 94 lie equidistant from the vertical centerline 40.

The operation of a bubble level indicator 74 as the one used herein is well known to those skilled in the art. As mentioned hereinabove, the projector leveling and focusing aid of the present invention is adapted for use in projectors having a principal support surface which is a vertical side of the projector nest area or which is a horizontal bottom of the projector nest area. When either of the two side edges 20 or 32 are perfectly vertical, i.e., conform to a vertical lie perpendicular to a horizontal line, the bubble 90 is bisected by the centerline 40 and lies completely between the vertical lines 96 and 98. The bubble 90 will have this same orientation when the bottom edge 26 of the slide 12 is perfectly level i.e., conforms to a horizontal line. If the side edges 20 and 32 of the slide 12 are not vertical, part or all of the bubble 90 may lie without the vertical line 96 or 98. Similarly, if the bottom 26 of the slide 12 is not level, part or all of the bubble 90 may lie without the vertical lines 96 or 98. Since the slide 12 is supported within the projector either along either of its side edges 20 or 32 or its bottom edge 26, any malalignment i.e., non-levelness of the projector will be transferred to the slide 12 and result in the displacement of the bubble 90 in the arcuate band which will be readily noticeable.

The slide 12 may be made as mentioned hereinabove, by conventional injection molding techniques. If so, the ends 84 and 86 of the chamber 76 are formed open. One end, either 84 or 86 of the chamber is then sealed by a plug ultrasonically welded therein. The fluid 88 is then placed in the chamber 76 and the other end of the chamber also sealed by a plug.

As mentioned hereinabove, the projector leveling and focusing aid of the present invention assists a projectionist in the leveling, focusing and aligning of a slide projector. When the aid 10 is positioned in a projector and the markings and patterns contained therein directed to a screen, the projectionist can readily ascertain if the projector is focused and level. If the image is not focused, the markings and patterns on the slide 12 will be hazy and unclear. The projectionist can then manipulate the lens system of the projector until the markings and patterns on the slide are clear and sharp.

In addition, the rectangluar patterns on the slide when projected on the screen, serve to outline the surface area of the screen to be covered by a projected transparency of a particular size. For instance, the rectangle identified by numeral 56 on the slide 12, will outline the area to be covered by a 34 millimeter slide projected onto the screen, so that the projectionist can readily tell if the complete image to be projected will be contained in the screen, of if a portion of the image will fall off the screen.

Figure 7:
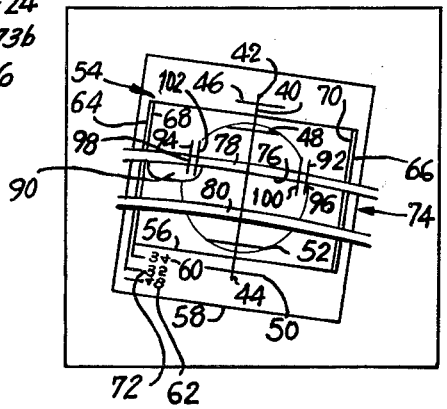
FIG. 7 is a plan view of a screen showing a possible image projected by the projector leveling and focusing device when the projector is not level.

If the projector is not level as will usually be the case if the projector has just been placed in position, the resultant image appearing on the screen may resemble that shown in FIG. 7 in which the bubble 90 in the bubble or level indicator 74 is not contained within the lines 96 and 98, but is positioned more to either the first set of vertical lines or the second pair of vertical lines (as shown). Such a situation is created since the slide 12 is supported within the projector and is held in the same orientation that a transparency holder would be.

By manipulating the leveling mechanism on the projector, the projector can be adjusted so that the bubble 90 in FIG. 7 moves into the position shown in FIG. 1, at which time the projectionist will know that the projector is level and the slides which will be subsequently shown will not be sloping.

To aid in the recognition of the bubble 90 on a screen, the fluid 88, as mentioned above may be colored so that the image on the screen will contain an arcuate colored band with a clear bubble therein.

Obviously, the projectionist, before resorting to the use of the projection leveling and focusing aid of the present invention, may first roughly level the projector using conventional methods.

While the above description detailed the structure of the projection leveling and focusing aid and its use with a single projector, the discussion which follows concerns a method of using the aid of properly align a plurality of projectors. It has long been a practice to use more than one projector during a visual presentation. Also, it has been the practice to sometimes, superimpose or align in vertical columns or horizontal rows images projected from more than one projector. Such programming requires that the individual projectors must be exactly level with respect to the horizontal and the images projected by each projector must be in registry or otherwise precisely aligned. If this is not the case, the resulting composite visual image will be distorted or will not truly represent that which is meant to be shown.

To this end, the projector leveling and focusing aid described hereinabove, if used in each of the projectors, provides an easy means to level the projectors with respect to each other and to properly adjust the location of the images so that they are in proper registry or aligned.

Figure 5:
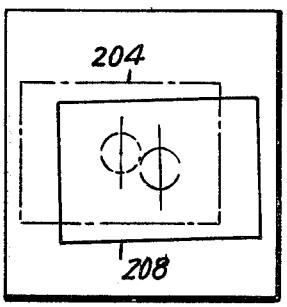
FIGS. 5 and 6 are views showing the sequential steps in the method of leveling and aligning a plurality of projectors in accordance with the method of the present invention.
Figure 6:
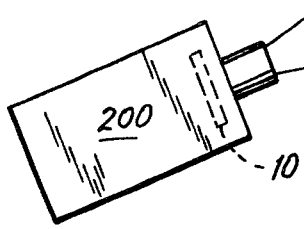
Figure 6:
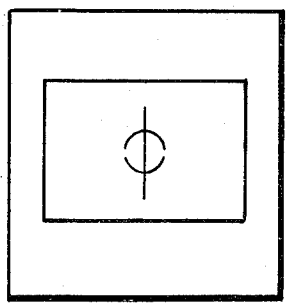

The method for aligning two such projectors is as follows and is schematically illustrated in FIGS. 4, 5, and 6. A first projector 200 is leveled and its image is focused on a screen 202 by use of the aid 10 in the manner hereinabove described. That image from projector 200 is represented in FIG. 5 by the outline 204. For the sake of simplicity, only the vertical center line and pattern of arcuate markings of each slide are shown. While the first projector is operating, a second projector 206 is then directed to the screen 202 with a second aid 10' positioned therein to produce an image represented by the outline 208. Frequently, the two projectors will not be level with each other nor will the images be in registry resulting in the non-alignment of the images as shown in FIG. 5. The projector 206 is brought level with the projector 200 through the same method described hereinabove i.e., adjusting the leveling mechanism of the projector 206 until the bubble in the arcuate band of the projector level is positioned at the center of the slide. Concurrently, the projector 206 may be displaced so that the vertical centerline and the circle pattern as well as the bubble in the bubble levels are brought into registry with the corresponding vertical centerline and circular pattern and bubble projected by the projector 200. Thereafter, the images projected by the projectors 200 and 206 will not be sloping and will be in registry.

In a similar manner, more than two projectors can be leveled and the projectors can be properly aligned so that the images projected therefrom will be in proper registry.

The bubble level indicators used in the different projectors may contain fluids of different colors so that it can be readily determined which of the projectors is not level, since the images produced by each projector will be overlapping.

It can be seen from the foregoing detailed description that the object of the present invention, namely to create an improved projection level and focusing aid has been achieved by a transparent slide body having the overall dimensions of a standard slide transparency mounting being provided with sets of markings and patterns thereon and a bubble level indicator.

When projected onto a screen, the slide creates an image in which the sets of markings and patterns can be used to not only indicate the surface area of the screen to be covered by the succeeding transparencies to be shown, but also means by which the focusing of the lens system of the projector can be achieved.

A pattern of concentric rectangles on the slide have the dimensions of standard transparencies and the rectangles may be appropriately labeled so that the projectionist can easily ascertain the surface area to be covered by the appropriate sized transparency. A set of vertical and arcuate lines which includes a vertical centerline and pairs of spaced horizontal lines at the top and bottom end portions of the centerline aid in the focusing of the projector.

The bubble level indicator consists of a narrow arcuate chamber extending across the mid-section of the slide which is filled with a colored fluid so that a bubble of air is formed in the chamber which will rise to the highest point in the chamber regardless of the particular orientation of the chamber and the slide. When the slide is level, the bubble in the chamber will be bisected by the vertical axial centerline on the slide. Additional vertical markings may be provided so that the extent of displacement of the bubble from the vertical axial centerline can be easily determined.

To use the device the slide is positioned within the projector and the projectionist can then adjust the leveling mechanism of the projector until the bubble in the chamber is bisected by the vertical axial centerline. When the condition exists, the transparencies which will be subsequently shown will not be sloping, but will be level with the horizontal.

The device in accordance with the present invention, can be used with more than one projector not only to level the projectors and focus them as hereinabove described, but also to ensure that the images to be projected will be in accurate registry. This is accomplished by adjusting the projectors so that the resulting images will be precisely overlapping one another.

While in accordance with the patent statutes, preferred embodiments of the present invention have been illustrated and described in detail, it is to be particularly understood that the invention is not limited thereto or thereby.

What is claimed is:

1. A leveling and focusing aid for a still image projector, said aid comprising:
 (a) a rectangular slide body of a rigid transparent material of the shape of and having overall dimensions which are substantially the same as the shape and overall dimensions of a standard transparency or slide holder so that said body is constructed and adapted to be received within said projector for projection onto a screen;
 (b) a level indication means including a bubble level indicator carried by and positioned on said slide body, said level indication means being so positioned on and oriented with respect to the slide body that the bubble indicates a level condition when the slide body is in the projector and the projector is level, said bubble level indicator comprising a narrow arcuate chamber, a major portion of said arcuate chamber being filled with a liquid to create a bubble of air therein, said air bubble being displaceable within said arcuate chamber to remain at the highest point therein and being responsive to the degree of deviation of said projector from the horizontal, said air bubble occupying the midpoint of said arcuate chamber when said slide body is level and said projector is horizontal; and
 (c) said slide body having at least one marking the image of which on the screen is oriented in a certain predetermined relationship to the indicator when the projector is level whereby such condition will be indicated on the screen, said at least one marking being positioned on said slide body and constructed and arranged with said arcuate chamber to indicate the extent of displacement of said air bubble from the midpoint of said arcuate chamber, and further having a plurality of markings provided on the slide body, said markings on the slide body being in the form of concentric rectangles, each of said rectangles being centered on said slide body and having the overall dimensions of a transparency of a particular size.

2. A method of focusing, leveling and aligning a plurality of slide transparency projectors having adjustable lens systems and leveling mechanisms comprising steps of:

(a) positioning a first transparent slide within a first slide transparency projector, said slide provided with a bubble level indicator in which a bubble of air trapped in a narrow arcuate band containing colored fluid will rise to the highest point within said band, said bubble occupying a positon at the mid-point of aid band when said first slide is level, said first slide being provided with pattern of lines and markings constructed and arraned to cooperate with said bubble level indicator to indicate the extent of deviation of said bubble from the mid-point of said band;

(b) projecting said first slide onto a screen so that said arcuate band, said bubble and said pattern of lines appears on said screen;

(c) focusing said first slide transparency projector by adjusting its lens system until said arcuate band, said bubble and said pattern of lines are clear and distinct on said screen;

(d) leveling said slide transparency projector by adjusting its leveling mechanism until said bubble within said arcuate band lies at the mid-point thereof to indicate that said first slide transparency projector is level;

(e) positioning a second transparent slide identical to said first slide within a second slide transparency projector;

(f) projecting said second slide onto said screen over the same area as said first slide;

(g) focusing said second slide transparency projector by adjusting its lens system until the arcuate band and pattern of lines are clear;

(h) adjusting said second slide transparency projector until said bubble contained within said arcuate band is positioned at the mid-point thereof; and (i) adjusting said second projector so that the image projected by said second slide is in registry with the image projected by said first slide so that subsequent images projected by said slide transparency projectors will be in registry.

* * * * *